US009722827B2

(12) United States Patent
Jackson

(10) Patent No.: US 9,722,827 B2
(45) Date of Patent: Aug. 1, 2017

(54) METHODS AND SYSTEMS FOR CREATING A SUPPLEMENTAL COMMUNICATION SIGNAL

(71) Applicant: Ixia, Calabasas, CA (US)

(72) Inventor: Stephen Samuel Jackson, Chapel Hill, NC (US)

(73) Assignee: Ixia, Calabasas, CA (US)

( * ) Notice: Subject to any disclaimer, the term of this patent is extended or adjusted under 35 U.S.C. 154(b) by 0 days.

(21) Appl. No.: 14/754,163

(22) Filed: Jun. 29, 2015

(65) Prior Publication Data

US 2016/0380671 A1    Dec. 29, 2016

(51) Int. Cl.
*H04B 1/04*       (2006.01)
*H04L 27/00*     (2006.01)

(52) U.S. Cl.
CPC ...... *H04L 27/0012* (2013.01); *H04L 27/0008* (2013.01)

(58) Field of Classification Search
CPC ........................................................ H04B 1/62
USPC ........................................................ 455/114.3
See application file for complete search history.

(56) References Cited

U.S. PATENT DOCUMENTS 5,103,459 A * 4/1992 Gilhousen ........... H04J 13/0022
                                                              370/206
5,687,166 A * 11/1997 Natali .................... H04B 1/707
                                                              370/209

OTHER PUBLICATIONS

Images obtained from Internet at least as early as Mar. 2, 2015. http://cp.literature.agilent.com/litweb/pdf/ads2008/wlan/3126570/wlan-02-1-15.gif (Retrieved Apr. 26, 2016).

* cited by examiner

*Primary Examiner* — Sanh Phu
(74) *Attorney, Agent, or Firm* — Jenkins, Wilson, Taylor & Hunt, P.A.

(57) ABSTRACT

A wireless access point or other transmitter can be configured to inject a supplemental signal into a data modulated carrier signal. In some examples, a transmitter system includes an antenna, a primary modulator, and a supplemental modulator. The primary modulator receives a baseband data signal and a carrier signal and outputting to the antenna a data modulated carrier signal according to a communications protocol. The supplemental modulator injects a supplemental signal into the data modulated carrier signal by distorting the data modulated carrier signal within an error bound of the communications protocol. A corresponding receiving system includes an antenna and a supplemental signal detector for detecting the supplemental signal by detecting the distortion within the data modulated carrier signal.

17 Claims, 6 Drawing Sheets

METHODS AND SYSTEMS FOR CREATING A SUPPLEMENTAL COMMUNICATION SIGNAL

TECHNICAL FIELD

The subject matter described in this specification relates generally to data communication using a supplemental signal, e.g., to injecting a supplemental signal into a data modulated carrier signal.

BACKGROUND

A wireless access point (AP) is an electronic device that is configured to enable wireless devices to connect to a wired network. For example, the access point can use Wi-Fi or other related standards, and the access point can connect to or be integrated with a router. An access point can have one or more antennas for radio frequency communication and a wired connection to the wired network, e.g., an Ethernet connection. Typically, access points are configured to use a communications protocol defined in Institute of Electrical and Electronics Engineers (IEEE) standards, e.g., IEEE 802.11 standards.

A hotspot is a physical space where wireless service is provided. A hotspot can be implemented using multiple access points configured so that wireless devices can connect to the Internet regardless of which particular access point is closest. Hotspots are becoming increasingly common, e.g., between coffee shops, restaurants, libraries, and other privately owned open access points that allow wireless devices to stay continuously or almost continuously connected to the Internet as users move about.

The increasing prevalence of wireless access points is useful in enabling the Internet of Things (IoT), where physical objects are uniquely identifiable and able to interoperate with the Internet using embedded computing systems. Devices in the IoT can collect and report useful data and perform other functions. For example, existing devices in the IoT include smart thermostat systems, biochip transponders on farm animals, and automobiles with built-in sensors and networking capability.

SUMMARY

A wireless access point or other transmitter can be configured to inject a supplemental signal into a data modulated carrier signal. In some examples, a transmitter system includes an antenna, a primary modulator, and a supplemental modulator. The primary modulator receives a baseband data signal and a carrier signal and outputting to the antenna a data modulated carrier signal according to a communications protocol. The supplemental modulator injects a supplemental signal into the data modulated carrier signal by distorting the data modulated carrier signal within an error bound of the communications protocol. A corresponding receiving system includes an antenna and a supplemental signal detector for detecting the supplemental signal by detecting the distortion within the data modulated carrier signal.

The subject matter described herein may be implemented in hardware, software, firmware, or any combination thereof. As such, the terms "function", "node" or "module" as used herein refer to hardware, software and/or firmware components for implementing the feature(s) being described. In some examples, the subject matter described herein may be implemented using a non-transitory computer readable medium having stored thereon computer executable instructions that when executed by the processor of a computer cause the computer to perform steps.

Computer readable media suitable for implementing the subject matter described herein include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described herein may be located on a single device or computing platform or may be distributed across multiple devices or computing platforms.

DETAILED DESCRIPTION

A wireless transmitter system, e.g., a wireless access point, can be configured to inject a supplemental signal into a data modulated carrier signal by distorting the data modulated carrier signal within an error bound of a communications protocol. The supplemental signal can be used by listening devices for various purposes. For example, the supplemental signal can be a timing signal, and listening devices can synchronize clocks or report data from sensors based on the timing signal.

Figure 1:
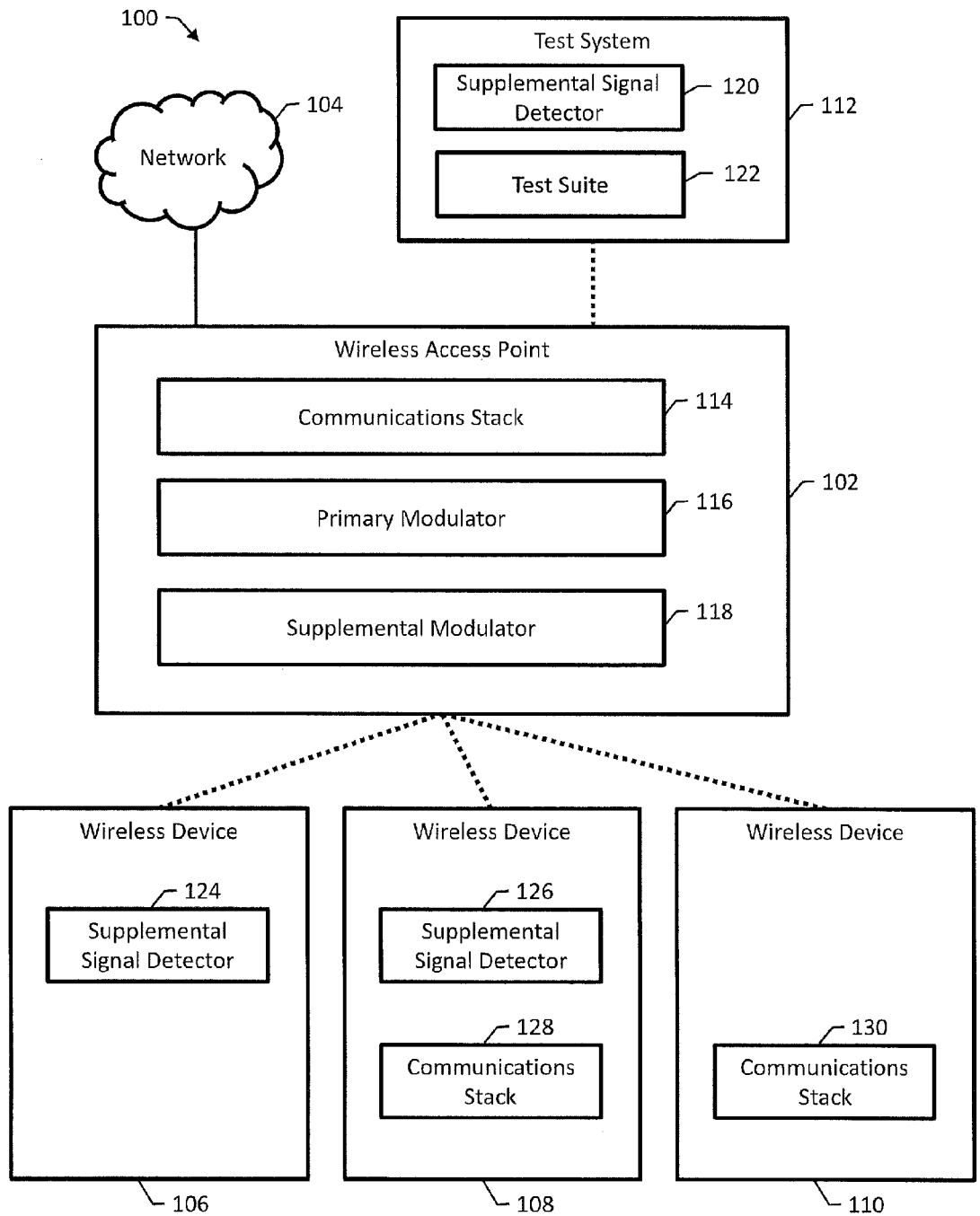
FIG. 1 is a block diagram of an example wireless communications environment.

FIG. 1 is a block diagram of an example wireless communications environment 100. Environment 100 includes an example wireless access point 102 for a data communications network 104, e.g., the Internet. Wireless access point 102 is configured to enable wireless access by a number of wireless devices 106, 108, and 110 to network 104. Environment 100 can also include a test device 112. Test device 112 is configured to test communications aspects of environment 100, e.g., to test wireless access point 102 and its ability to enable wireless access to network 104.

Wireless access point 102 includes a communications stack 114 and a primary modulator 116. Communications stack 114 is configured to generate a baseband data signal in compliance with a communications protocol, e.g., a protocol as specified by an IEEE 802.11x standard, an IEEE 802.22 standard, or any appropriate standard. Primary modulator 116 modulates the baseband data signal with a carrier signal to generate a data modulated carrier signal. Wireless access point 102 transmits the data modulated carrier signal using an antenna.

Wireless devices 108 and 110 include communications stacks 128 and 130 that are compatible with communications stack 114 of wireless access point 102. So wireless device 108 and 110 are configured, by virtue of communications stacks 128 and 130, to receive a data modulated carrier signal from wireless access point 102 and to recover data from the data modulated carrier signal by demodulating the signal. Wireless devices 108 and 110 can be mobile devices, e.g., mobile phones, tablets, laptop computers, or any appropriate type of mobile device.

Wireless devices 108 and 110 are also configured to transmit to wireless access point 102 using communication stacks 128 and 130. Wireless access point 102 can receive data from wireless devices 108 and 110 using communications stack 114. Therefore, wireless devices 108 and 110 can send and receive data from network 104.

Wireless access point 102 includes a supplemental modulator 118 for injecting a supplemental signal into the data modulated carrier signal. Supplemental modulator 118 can inject the supplemental signal by distorting the data modulated carrier signal within an error bound of the communications protocol used by communications stack 114. For example, supplemental modulator 118 can distort the data modulated carrier signal by an amount smaller than a violation threshold amount specified by the communications protocol.

In some examples, supplemental modulator 118 distorts the data modulated carrier signal by injecting a phase shift, a frequency shift, or an amplitude shift, or a combination or two or more of a phase shift, a frequency shift, and an amplitude shift. For example, suppose that primary modulator 116 uses a quadrature amplitude modulation scheme. Supplemental modulator can inject a frequency shift into the data modulated carrier signal so that the distortion does not go outside the error bound, since quadrature amplitude modulation is generally resilient to frequency shifts.

Since supplemental modulator 118 distorts the data modulated carrier signal within the error bound, wireless access point 102 can continue to communicate with wireless devices 108 and 110 using communications stack 114, and wireless devices 108 and 110 can continue to communicate with wireless access point 102 using communication stacks 128 and 130. Wireless devices 108 and 110 can continue to communicate with network 104 using wireless access point 102.

Wireless devices 106 and 108 include supplemental signal detectors 124 and 126 that are configured to detect the supplemental signal injected into the data modulated carrier signal by supplemental modulator 118. Supplemental signal detectors 124 and 126 detect the supplemental signal by detecting the distortion within the data modulated carrier signal.

Since wireless device 108 includes both communications stack 128 and supplemental signal detector 126, wireless device 108 can detect both the data from primary modulator 116 and the supplemental signal from supplemental modulator 118. Even though wireless device 110 lacks a supplemental signal detector, wireless device 110 can continue to operate normally and communicate with network 104 by wireless access point 102, just as wireless device 110 would communicate with a wireless access point lacking a supplemental modulator. Consequently, wireless access point 102 can be used in conventional wireless networks and support conventional wireless devices even though wireless access point 102 includes supplemental modulator 118.

Wireless device 106 lacks a communications stack compatible with communications stack 114, and therefore cannot communicate with network 104 using communications stack 114. Wireless device 106 can nonetheless receive the supplemental signal from supplemental modulator 118 using supplemental signal detector 124. Since wireless device 106 lacks a communications stack compatible with communications stack 114, wireless device 106 can save one or more of size, weight, cost, and power usage compared to wireless devices 108 and 110 that do include communications stacks 128 and 130 that are compatible with communications stack 114.

For example, wireless device 106 can be an embedded computing system useful, e.g., for devices in the Internet of Things (IoT). Since wireless device 106 can have reduced size, weight, cost, and/or power usage compared to wireless devices 108 and 110, wireless device 106 can be embedded into systems with reduced size, weight, cost, and/or power requirements. Similarly, wireless device 108 can deactivate communications stack 128 when appropriate to save power, e.g., in situations where supplemental signal detector 126 is sufficient to handle communication requirements of wireless device 108. To illustrate some of the possibilities, consider the following examples.

In some examples, supplemental modulator 118 is configured to provide a timing signal by distorting the data modulated carrier signal periodically at fixed periodic intervals. For example, supplemental modulator 118 can distort the data modulated carrier signal at the top of every second, thereby injecting a supplemental signal that is a timing signal into the data modulated carrier signal. Wireless device 106 can then receive accurate timing information from wireless access point 102 and take any appropriate action using the timing information, e.g., by synchronizing a clock signal using supplemental signal detector 124. Wireless device 108 can deactivate communications stack 128 to save battery power and reactivate communications stack 128 based on the received timing signal.

For example, a supplemental signal detector can be included in an embedded computing system with a sensor and a reporting circuit for wirelessly reporting data collected from the sensor. The reporting circuit can report the data periodically based on the timing signal, e.g., once every second or multiple of a second. The sensor can be, e.g., a seismic sensor reporting seismic data, a sensor in a door knob to distinguish between door slams and seismic events, or a traffic sensor embedded into the pavement of a road where the timing signal can be picked up from wireless access points in passing cars.

In another example, a supplemental signal detector can be included in a medical delivery robot configured to deliver medicine at a designated time. The medical delivery robot can determine the current time using the timing signal and compare the current time to the designated time. In another example, a supplemental signal detector can be included in a Bluetooth headset. The Bluetooth headset can use the timing signal to synchronize with a Bluetooth device and to reduce power consumption, which can be useful, e.g., to extend battery life. In another example, a supplemental signal detector can be included in a wrist watch for accurate time keeping or other purposes.

In some examples, supplemental modulator 118 extends the utility of preamble and pilot signals, e.g., as used in the 802.11x protocols. The preamble and pilot signals are conventionally used by listening receivers to facilitate synchronization and channel estimation and/or modeling, e.g., during an initialization sequence. During the initialization sequence, the communication protocol used by communications stack 114 can have a wider range of tolerance to facilitate communications with new devices. The wider range of tolerance creates a wider range in which to distort the data modulated carrier signal without exceeding an error tolerance, thereby creating an opportunity to create what is effectively a new narrowband channel during the initialization sequence.

For example, suppose that primary modulator 116 modulates a preamble and/or pilot signal using phase shift keying (PSK). Supplemental modulator 118 can distort the resulting data modulated carrier signal using a different modulation scheme, such as amplitude shift keying (ASK) or frequency shift keying (FSK), and use the different modulation scheme to encode additional information. In those cases, communications stacks 128 and 130 can be configured to receive and detect the modulated preamble and/or pilot signals and use those signals as per 802.11x guidelines. Supplemental signal detectors 124 and 126 can be configured to detect and extract the additional information. The additional information can be related to telecommunications network operation, e.g., commercial information for viewing by mobile device users, control information such as Wi-Fi offload control instructions, high-precision timing information, or other network access control information.

Test system 112 includes a supplemental signal detector 120 and a test suite 122 of software. Supplemental signal detector 120 can be implemented using conventional wireless networking hardware, e.g., using a spectrum analyzer that can be used for testing primary modulator 116, supplemental modulator 118, and other types of wireless networking equipment. Test suite 122 can present a user interface for a user and present test reports using supplemental signal detector 120, e.g., reports indicating whether supplemental modulator 118 is operating in accordance with a design specification.

Although the environment has been illustrated with wireless access point 102, any appropriate wireless transmitter can be used to transmit the data modulated carrier signal and the supplemental signal. For example, a base station of a wireless regional area network (WRAN) can be used to transmit the signals as specified by IEEE 802.22 and related standards.

Figure 2A:
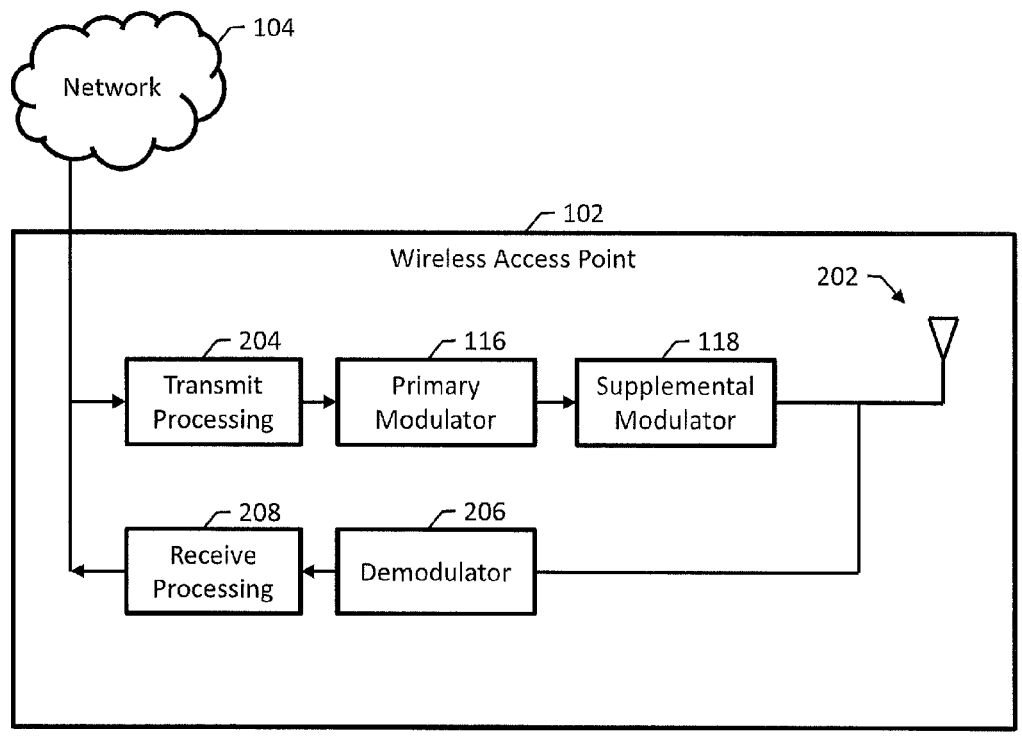
FIG. 2A is a block diagram illustrating the example wireless access point.

FIG. 2A is a block diagram illustrating the example wireless access point 102. Wireless access point 102 includes a transmit processing circuit 204 that receives data from network 104 and prepares the data for modulation by primary modulator 116. Primary modulator 116 receives a baseband data signal from transmit processing circuit 204 and a carrier signal and outputs to an antenna 202 a data modulated carrier signal. Antenna 202 can be comprised of multiple antennas, e.g., in examples where wireless access point 102 is implemented using multiple-input and multiple-output (MIMO) technology.

Supplemental modulator 118 lies between primary modulator 116 and antenna 202. When supplemental modulator 118 is operating, supplemental modulator 118 injects a supplemental signal into the data modulated carrier signal by distorting the data modulated carrier signal within an error bound of the communications protocol. The resulting distorted data modulated carrier signal is transmitted by antenna 202.

Wireless access point 102 can use antenna 202 for both transmitting and receiving. While receiving, demodulator 206 demodulates a received signal. Receive processing circuit 208 outputs the received data to network 104. Therefore, wireless devices can send and receive data from network 104 using wireless access point 102.

Figure 2B:
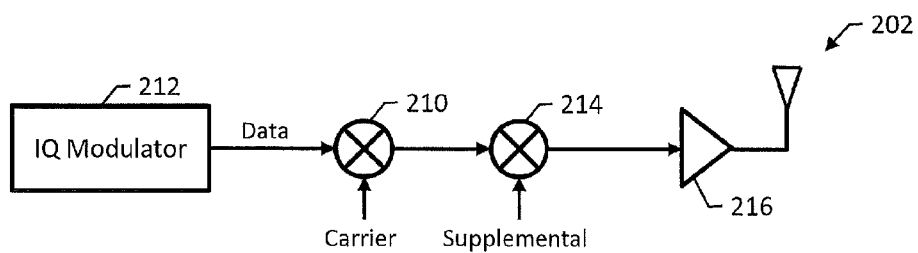
FIG. 2B illustrates part of an example transmission pipeline for a wireless access point.

FIG. 2B illustrates part of an example transmission pipeline for a wireless access point 102. A first modulator 210 modulates data from an IQ modulator 212 with a carrier signal. A second modulator 214 modulates the output of the first modulator 210 with a supplemental signal. An amplifier 216 amplifies the output of the second modulator 214. The antenna 202 transmits the output of the amplifier 216.

In FIG. 2B, the supplemental signal is injected between the first modulator 210 and the amplifier 216. In some other examples, the supplemental signal is injected at another location in a transmission pipeline. For example, the supplemental signal can be injected after the amplifier 216.

Figure 3A:
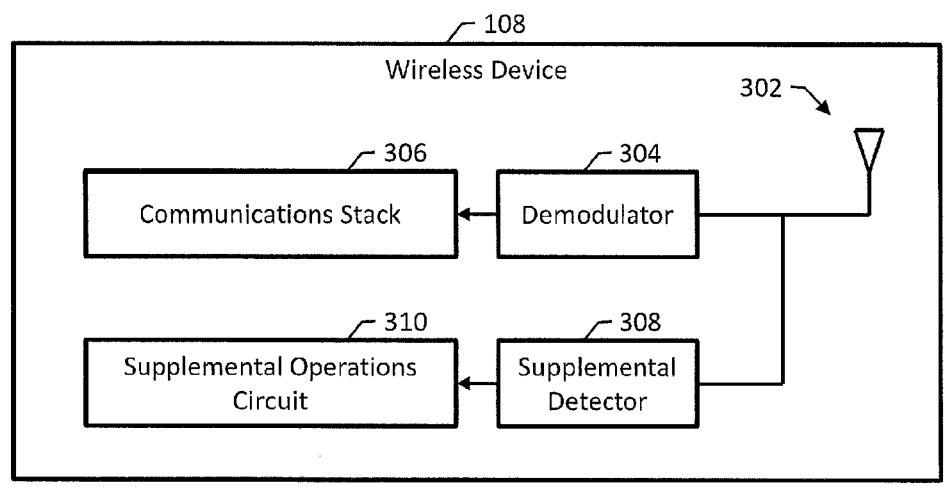
FIG. 3A is a block diagram of a first wireless device.

FIG. 3A is a block diagram of a first wireless device 108. Wireless device 108 includes an antenna 302 that is coupled to a demodulator 304. Demodulator 304 demodulates a received signal from the antenna and provides the demodulated signal to a communications stack 306. Communications stack 306 is configured to communicate according to a communications protocol. The communications protocol can be, e.g., an 802.11 protocol, an 802.22 protocol, a long term evolution (LTE) protocol, an amplitude modulation (AM) or frequency modulation (FM) protocol, a phase modulation protocol, or a combination of protocols.

Antenna 302 is also coupled to a supplemental detector 308. Supplemental detector 308 is configured to detect a supplemental signal injected into the received signal. Demodulator 304 and communications stack 306 do not detect the supplemental signal because the supplemental signal is injected by distorting a data modulated carrier signal within an error bound of the communications protocol used by communications stack 306.

Wireless device 108 includes a supplemental operations circuit 310 that uses the supplemental signal for any appropriate purpose. For example, supplemental operations circuit 310 can synchronize a clock using the supplemental signal as described above with reference to FIG. 1. Supplemental operations circuit 310 can be useful, e.g., for communicating while communications stack 306 is deactivated to save power, or when communications stack 306 is booting up or otherwise inoperative.

Figure 3B:
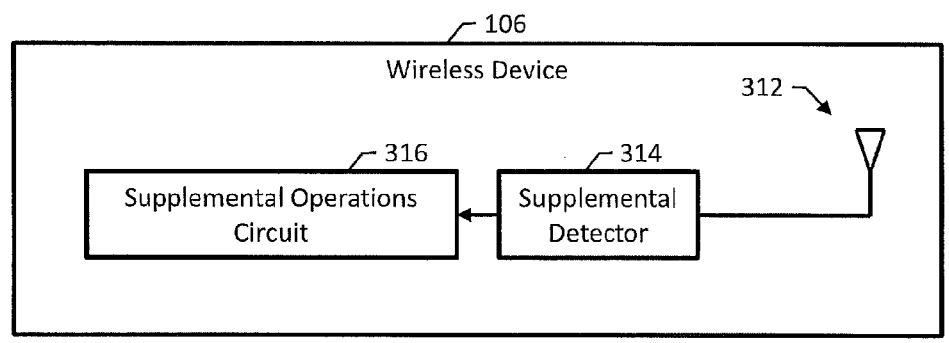
FIG. 3B is a block diagram of a second wireless device.

FIG. 3B is a block diagram of a second wireless device 106. Wireless device 106 includes an antenna 312, a supplemental detector 314, and a supplemental operations circuit 316, similar to wireless device 108. Unlike wireless device 108, wireless device 106 lacks communications stack 306. Wireless device 106 can have reduced size, weight, cost, and/or power usage compared to wireless device 108, which can be useful in applications where communications stack 306 is not needed and supplemental detector 314 can fulfill the wireless communication requirements of the application.

Figure 3C:
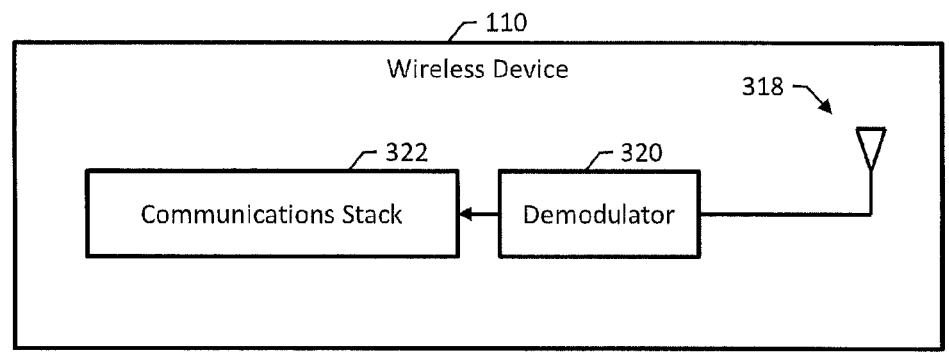
FIG. 3C is a block diagram of a third wireless device.

FIG. 3C is a block diagram of a third wireless device 110. Wireless device 110 includes an antenna 318, a demodulator 320, and a communications stack 322, similar to wireless device 108. Unlike wireless device 108, wireless device 110 lacks supplemental detector 308. So wireless device 110 does not detect a supplemental signal within the error bounds of the communications protocol used by communications stack 322.

Wireless device 110 can nonetheless continue to operate normally using communications stack 322 even though the received signal has been injected with the supplemental signal. This is useful, e.g., so that legacy wireless devices can continue to operate with access points that inject a supplemental signal, or to save size, weight, cost, and/or power usage compared to wireless device 108.

Figure 4:
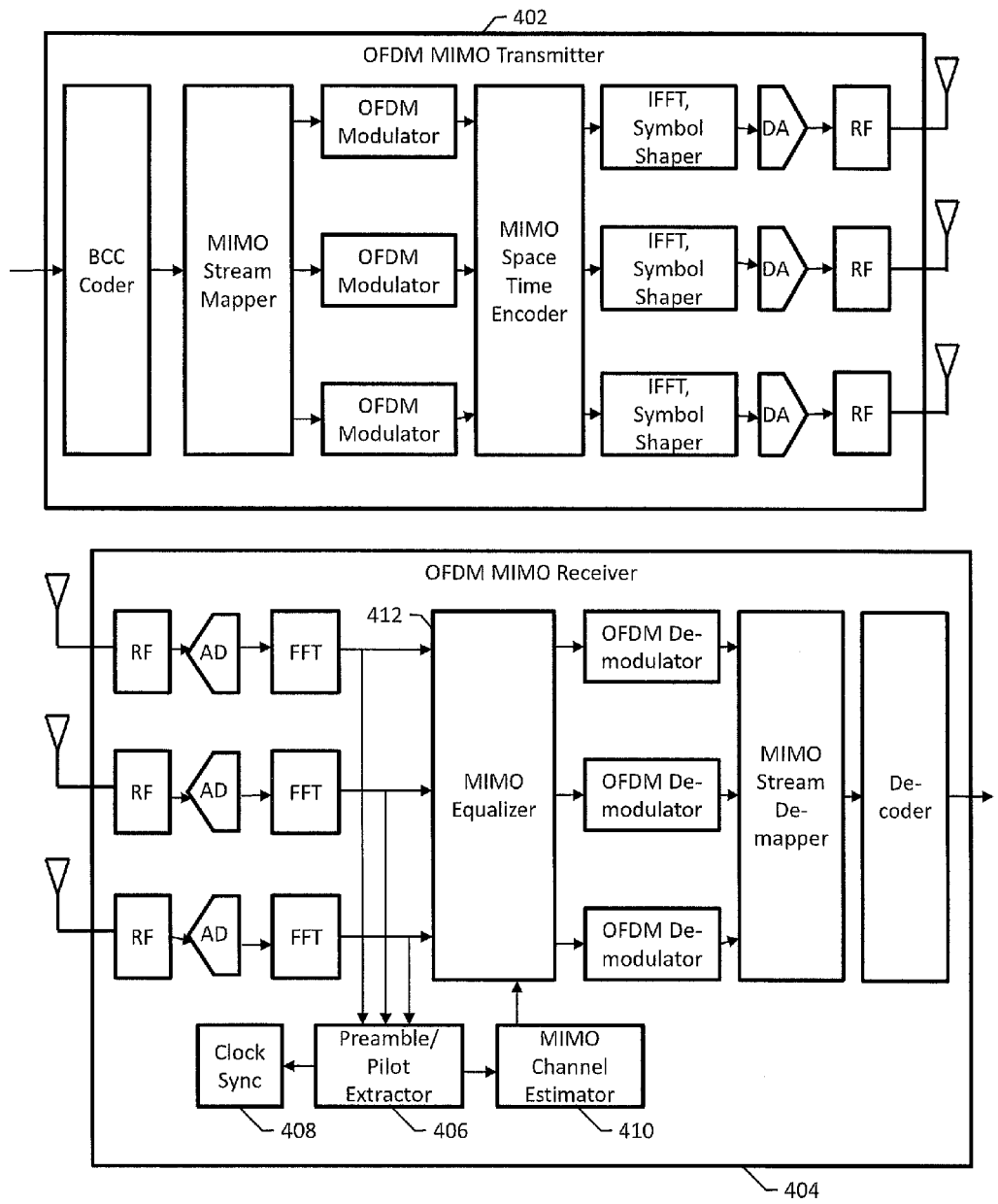
FIG. 4 is a block diagram of an orthogonal frequency-division multiplexing (OFDM) transmitter and receiver.

FIG. 4 is a block diagram of an orthogonal frequency-division multiplexing (OFDM) transmitter 402 and receiver 404. OFDM transmitter 402 can be used in the wireless access point 102 of FIG. 1. OFDM receiver 404 can be used in one of the wireless devices 106, 108, and 110 of FIG. 1. OFDM transmitter 402 and OFDM receiver 404 communicate using MIMO technology. OFDM transmitter 402 and OFDM receiver 404 can communicate using an IEEE 802.11x protocol that makes use of preamble and pilot signals.

Preamble and pilot signals can be used to facilitate synchronization, as well as to estimate and/or model a communication channel between OFDM transmitter 402 and OFDM receiver 404. To facilitate synchronization, special synchronization spectral power density events (SPDEs) or signals may be transmitted at known times so that the receiver may use these signals to frequency and phase lock its clock oscillator with that of the transmitter. Other SPDE may be transmitted which are not part of the synchronization process.

For example, in IEEE 802.11 wireless Local Area Networks (WLANs), these synchronization signals may be referred to as the Short Training Field (STF), the Long Training Field (LTF) and the pilots. The training fields may contain sequences of specially selected and well-known data symbols that are decoded by OFDM receiver 404, and may make it simple to obtain an accurate estimate of the clock phase offset between local oscillators of OFDM receiver 404 and OFDM transmitter 402.

Pilots are specific symbol/subcarrier combinations that do not carry data, but may instead be set to known values similar to the STF and LTF. Pilots may therefore provide a-priori known reference points scattered throughout the incoming packets containing well-known symbols. The receiver may then decode these pilots to determine their symbol boundaries, and may then use this information to recalculate the phase offset between receive and transmit oscillators. The phase offset may then be used to correct and re-synchronize the receive oscillator to the transmit oscillator. As the pilots are transmitted periodically throughout the packet, they may assist in keeping the receive and transmit oscillators synchronized throughout the length of the packet, and may mitigate any clock drift problems.

OFDM receiver 404 includes a preamble/pilot extractor 406 which can extract preamble and pilot information from the received baseband signal. Preamble/pilot extractor 406 can supply the preamble and pilot information to clock synchronization logic 408, e.g., to align receive and transmit clocks. Preamble/pilot extractor 406 can also supply the preamble and pilot information to MIMO channel estimator 410. MIMO channel estimator 410 can produce an estimate of a channel matrix and calculate equalization parameters that can be passed to MIMO equalizer 412.

In some examples, OFDM transmitter 402 injects a supplemental signal into the preamble and pilot signals. For example, suppose that the preamble and pilot signals are modulated using phase shift keying (PSK). The preamble and pilot signals can be additionally modulated using a different modulation scheme, such as amplitude shift keying (ASK) or frequency shift keying (FSK). The different modulation scheme is used to encode additional information, e.g., a timing signal.

Figure 5:
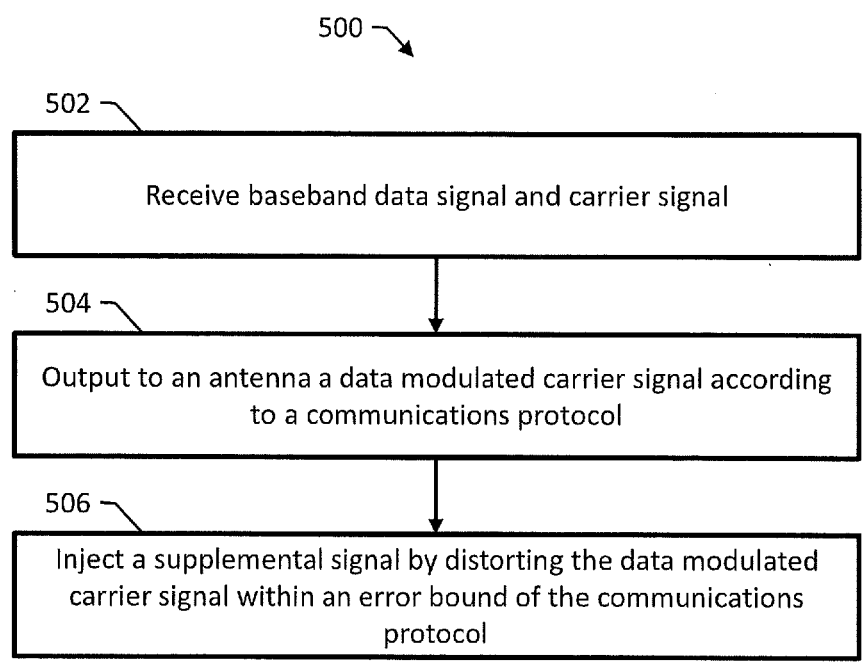
FIG. 5 is a flow diagram of an example method performed by a wireless transmitter system.

FIG. 5 is a flow diagram of an example method 500 performed by a wireless transmitter system. The wireless access point 102 of some components of the wireless access point 102 can perform the method 500.

The system receives a baseband data signal and a carrier signal (502). The system modules the baseband data signal with the carrier signal and outputs, to an antenna, the resulting data modulated carrier signal (504). The data modulated carrier signal is formed according to a communications protocol. The system injects a supplemental signal into the data modulated carrier signal by distorting the data modulated carrier signal within an error bound of the communications protocol (506).

For example, suppose that the system forms the data modulated carrier signal using a phase modulation scheme. The system can distort the data modulated carrier signal by varying the frequency to a degree that is small enough that the system can still communicate using that phase modulation scheme, even with the frequency variation. In that case, distorting the data modulated carrier signal by varying the frequency may be useful, e.g., because the phase modulation scheme is more robust to variations in frequency.

In another example, suppose that the system forms the data modulated carrier signal using an amplitude modulation scheme. The system can distort the data modulated carrier signal by varying the phase or frequency to a degree that is small enough that the system can still communicate using the amplitude modulation scheme, even with the phase or frequency variation. In general, the supplemental signal can be injected using a variation selected based on the communications protocol, i.e., selected so that that the communications will be robust to the type of variation.

Figure 6:
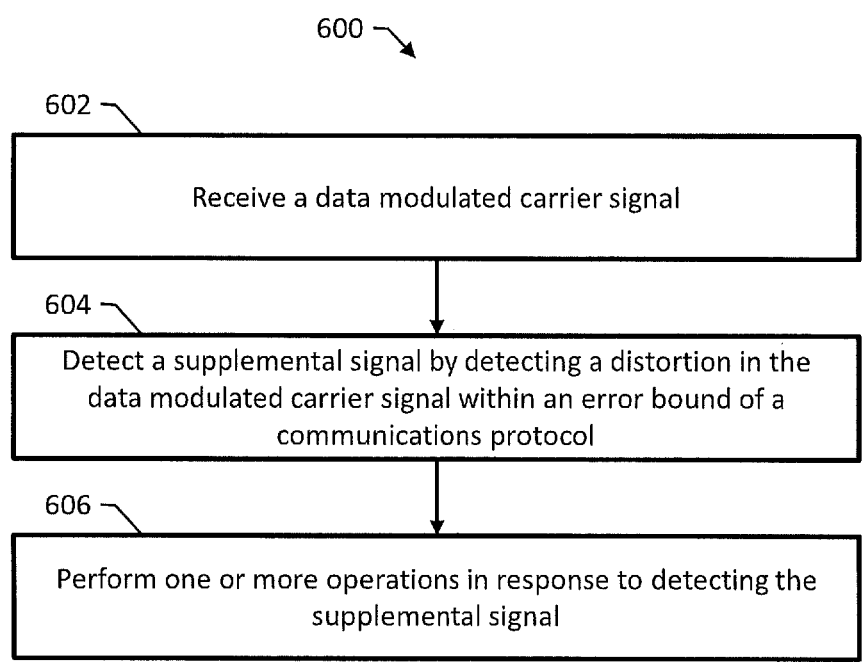
FIG. 6 is a flow diagram of an example method performed by a wireless receiver system.

FIG. 6 is a flow diagram of an example method 600 performed by a wireless receiver system. The wireless devices 106 and 108 of FIG. 1 or some components of the wireless devices 106 and 108 can perform the method 600.

The system receives a data modulated carrier signal (602). The system detects a supplemental signal injected into the data modulated carrier signal by detecting a distortion in the data modulated carrier signal within an error bound of a communications protocol (604). The system performs one or more operations in response to detecting the supplemental signal (606). For example, the system can synchronize a clock or report data from a sensor as described above with reference to FIG. 1.

In general, the system can take any appropriate action to make use of the supplemental signal. For example, the system can report data from a sensor at periodic intervals determined using the supplemental signal. In another example, the system can control a robot to take an action, e.g., deliver medicine, according to a schedule using the supplemental signal. In another example, sensors embedded into a road can be triggered by the supplemental signal to send a report as a car with a Wi-Fi access point passes over the road; the collective data from the sensors can be used to determine the speed of the car, e.g., for research purposes. In another example, the system can be included with a Bluetooth headset or other device so that the Bluetooth device can synchronize its clock.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system comprising:
   an antenna;
   a primary modulator for receiving a baseband data signal and a carrier signal and outputting to the antenna a data modulated carrier signal according to a communications protocol; and
   a supplemental modulator for injecting a supplemental signal into the data modulated carrier signal by distorting the data modulated carrier signal within an error bound of the communications protocol, wherein distorting the data modulated carrier signal within the error bound of the communications protocol comprises distorting the data modulated carrier signal by an amount smaller than a violation threshold amount specified by the communications protocol used by the primary modulator;

wherein the system is configured as a wireless access point for the communications protocol between a data communications network and a mobile device; and wherein distorting the data modulated carrier signal within the error bound comprises distorting the data modulated carrier signal during an initialization sequence for the wireless access point and ceasing distorting the data modulated carrier signal after the initialization sequence for the wireless access point.

2. The system of claim 1, wherein distorting the data modulated carrier signal within an error bound of the communications protocol comprises distorting the data modulated carrier signal periodically at fixed periodic intervals.

3. The system of claim 1, wherein the supplemental modulator is coupled between the primary modulator and the antenna, and wherein distorting the data modulated carrier signal comprises modulating the data modulated carrier signal after the primary modulator outputs the data modulated carrier signal.

4. The system of claim 1, wherein the primary modulator is configured to receive the baseband data signal based on data from the data communications network and modulate the baseband data signal for receipt by the mobile device.

5. The system of claim 4, wherein distorting the data modulated carrier signal within the error bound of the communications protocol comprises distorting the data modulated carrier signal so that the mobile device can recover the baseband data signal from the data modulated carrier signal even with the supplemental modulator distorting the data modulated carrier signal.

6. The system of claim 4, wherein distorting the data modulated carrier signal within the error bound comprises distorting the data modulated carrier signal during transmission of a pilot signal for the wireless access point as specified by the communications protocol.

7. The system of claim 1, wherein distorting the data modulated carrier signal comprises injecting a phase shift, a frequency shift, or an amplitude shift, or a combination of two or more of a phase shift, a frequency shift, and an amplitude shift.

8. The system of claim 1, wherein distorting the data modulated carrier signal comprises applying a second communications protocol different from the communications protocol to the data modulated carrier signal.

9. A system comprising:
an antenna;
a supplemental signal detector for detecting a supplemental signal injected into a data modulated carrier signal received by the antenna by detecting a distortion within the data modulated carrier signal within an error bound of a communications protocol for data modulating a carrier signal of the data modulated carrier signal, wherein the data modulated carrier signal is distorted by an amount smaller than a violation threshold amount specified by the communications protocol; and a clock synchronization circuit for periodically synchronizing a clock signal using the supplemental signal detector by detecting distortions, within the error bound of the communications protocol, in the data modulated carrier signal at fixed periodic intervals.

10. The system of claim 9, comprising a circuit for responding to detecting the distortion by performing an operation and transmitting a result of the operation.

11. The system of claim 10, wherein performing an operation comprises taking a measurement and wherein transmitting the result comprises transmitting the measurement.

12. The system of claim 9, comprising a primary communications stack for demodulating the data modulated communications signal and recovering a baseband data signal from the data modulated communications signal even with the supplemental signal distorting the data modulated carrier signal by virtue of the distortion being the amount smaller than the violation threshold amount specified by the communications protocol.

13. The system of claim 12, wherein the primary communications stack is configured to communicate with a data communications network over the antenna by way of a wireless access point.

14. The system of claim 13, wherein the supplemental signal detector is configured to detect the supplemental signal during an initialization sequence for the wireless access point.

15. The system of claim 13, wherein the supplemental signal detector is configured to detect the supplemental signal during transmission of a pilot signal for the wireless access point as specified by the communications protocol.

16. The system of claim 9, wherein the system lacks a primary communications stack for demodulating the data modulated communications signal.

17. The system of claim 9, wherein detecting the distortion within the data modulated carrier signal comprises detecting a phase shift, a frequency shift, or an amplitude shift, or a combination of two or more of a phase shift, a frequency shift, and an amplitude shift.

* * * * *